Jan. 31, 1956     J. J. McLAUGHLIN     2,732,922
CONVEYOR

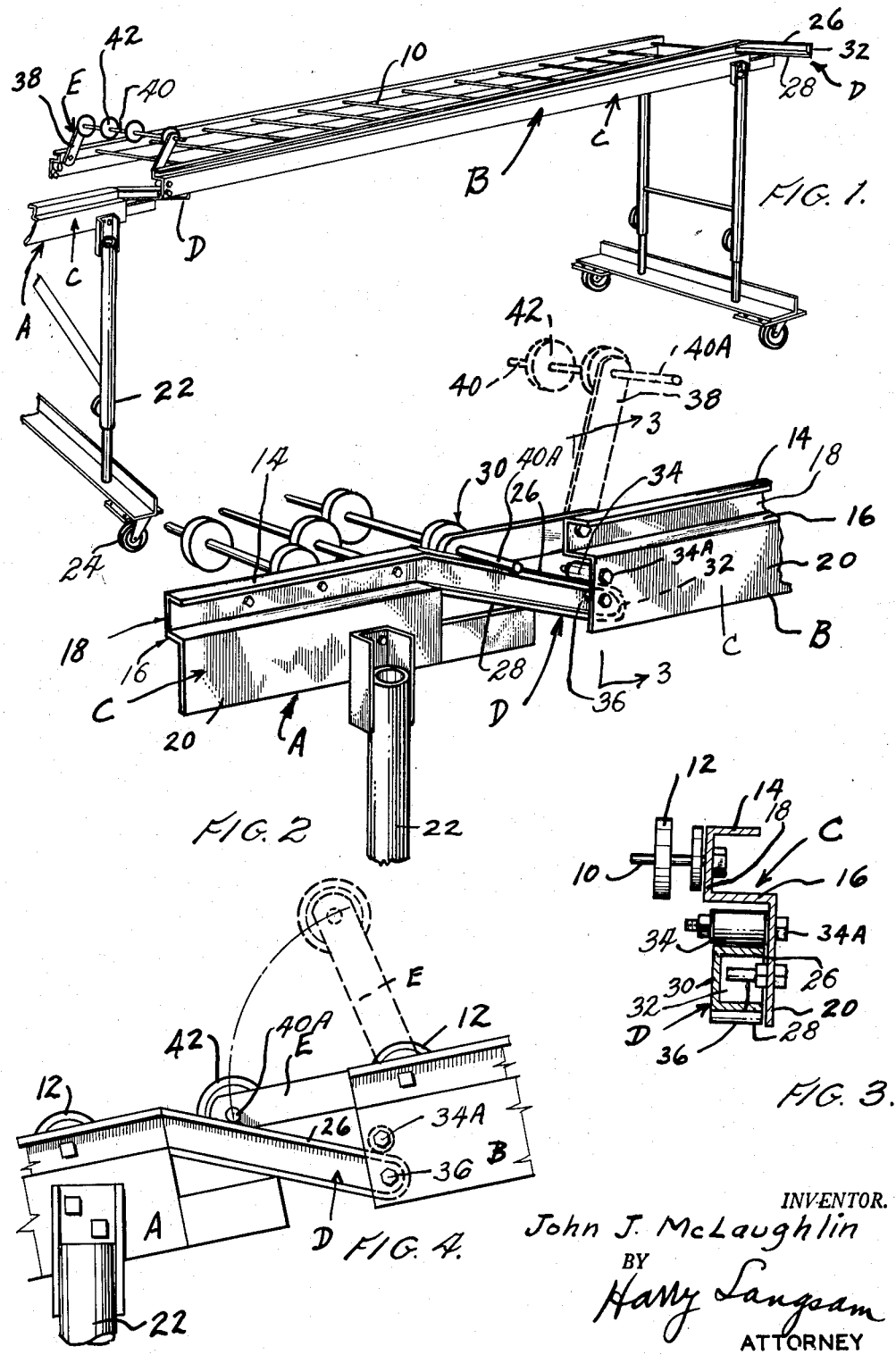

Filed Nov. 13, 1953     3 Sheets-Sheet 2

INVENTOR.
JOHN J. McLaughlin
BY Harry Langsam
Attorney

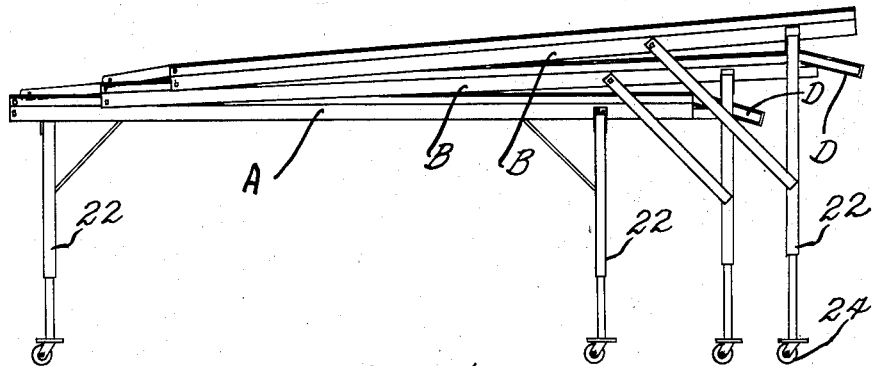
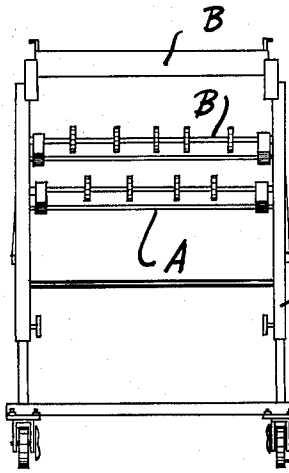
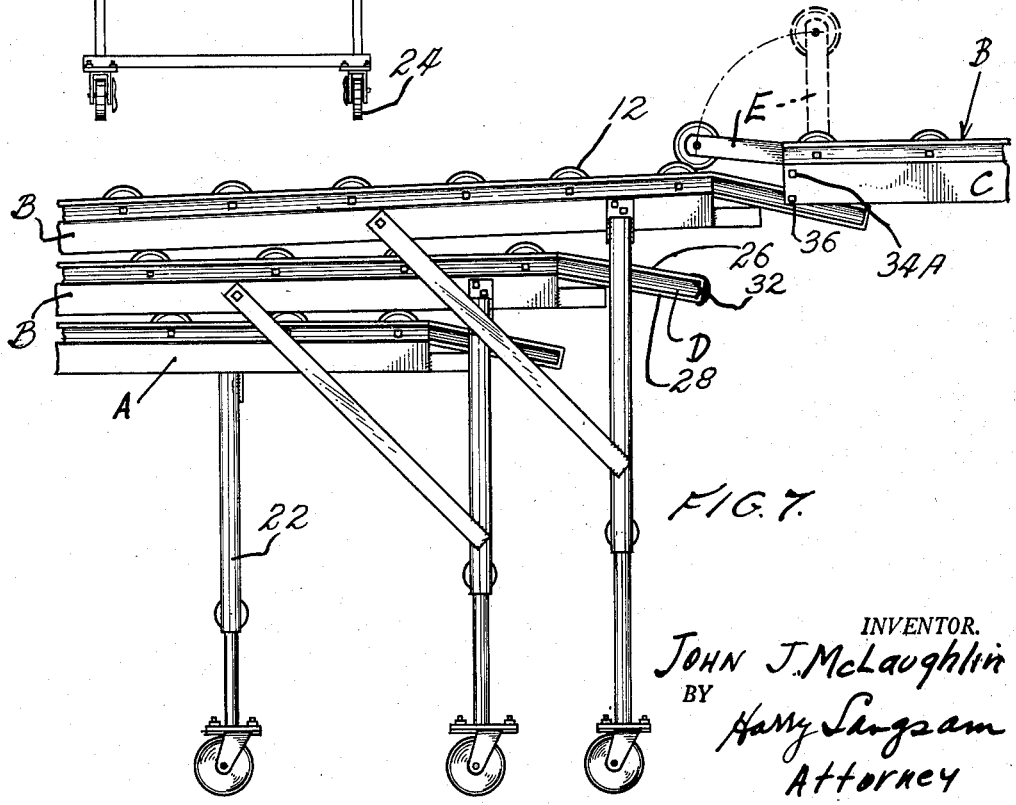

United States Patent Office 2,732,922
Patented Jan. 31, 1956

2,732,922
CONVEYOR

John J. McLaughlin, Philadelphia, Pa., assignor to The Wilkie Company, Philadelphia, Pa.

Application November 13, 1953, Serial No. 391,865

5 Claims. (Cl. 193—35)

My invention relates to conveyors and relates particularly to a conveyor made up of a plurality of sections. In my Patent No. 2,613,789, granted October 14, 1952, I show a plurality of conveyor sections, which frame substantially, a continuous line when the sections are extended. However, each telescoping section must climb a ramp-like mechanism to reach the plane of the section preceding and above it. In practice, the constant vibration permits the succeeding section to slide back down the ramp and out of plane with the section above it. When the sections are not extended, the difference in elevation between sections is too abrupt for many small articles.

In another previous patent, No. 2,613,788, I show telescopic conveyor sections which are supported from the section above by means of oppositely disposed channels that telescope one on the other, remaining in constant metal to metal contact while telescoping. Provisions must be made to adjust the legs of each of the conveyor sections to keep the sections in the proper incline relationship, and when in use, loading or unloading trucks of varying floor heights, binding is prevalent unless the legs are readjusted accordingly. At some time in the telescoping action, each section (with the exception of the uppermost section) is unsupported from the floor requiring the entire weight of the sections to be telescoped. Also, in truck unloading, the weight of the entire plurality of conveyor sections and supporting legs (with the exception of the uppermost section) must be advanced into the truck. Meanwhile, the discharge end of the lowermost section and leg gradually lower in height until the ground is reached. This last condition is objectionable as the raising and lowering of the discharge end of the conveyor makes it difficult to fasten to flooring, or to other fixed height, supplementary conveyors.

It is an object of my invention to provide a plurality of sections of a conveyor wherein the upper surface will be inclined, but wherein the supporting legs, once adjusted, need not be adjusted again even though different floor elevations are encountered. I have accomplished this in the design of this invention by allowing the angle of the conveyor section to change as the conveyor is extended, while the supporting legs remain in contact with the floor.

Another object of my invention is to provide an incline surface for a plurality of conveyor sections when the conveyor is extended, wherein each section must descend along a ramp-like mechanism to reach the plane of the section succeeding and below it, assuring that the sections remain in plane.

Another object of my invention is to provide a plurality of conveyor sections which may be telescoped to a closed position without changing any elevation of any sections which have been used in extended position.

Another object of my invention is to provide a plurality of telescopic conveyor sections wherein the lowermost section is resting upon ground supporting legs, and supports the remaining telescoping sections.

Another object of my invention is to provide an article carrying conveyor wherein the sections of the conveyors easily nestle together and activate a roller bearing located at the front end of the section above. Since the telescoping sections activate only the roller bearing of each other, almost all friction ends, as well as all binding, considerably easing the telescoping action.

Another object of my invention is to provide a plurality of conveyor sections which will provide a continuous inclined plane and which will be limited in movement in their extended position.

Another object of my invention is to provide an article carrying conveyor wherein the supporting legs are always in direct contact with the floor, easing the telescoping action as it is not necessary to telescope the weight of any section of the conveyor.

Another object of my invention is to provide an article carrying conveyor wherein the supporting legs are always in direct contact, and can be fastened to the flooring permitting the uppermost section to be advanced.

Another object of my invention is to provide an article carrying conveyor wherein its use for truck unloading only one section is advanced into the truck at a time and the lowermost section remains at the desired height for joining to other fixed height supplementary conveyor equipment.

Another object of my invention is to provide a telescopic conveyor, each section of which pivots in a slight arc around the horizontal axis of the roller bearings to permit greater flexibility in respect to uneven floor surfaces.

Another object of my invention is to provide an article carrying conveyor wherein a pivoted roller is mounted to the discharge end of each section to change the elevation.

Other objects of my invention are to provide an improved device of the character described, that is easily and economically produced, which is sturdy in construction, and which is highly efficient in operation.

With the above and related objects in view, my invention consists in the details of construction and combination of parts, as will be more fully understood from the following description, when read in conjunction with the accompanying drawings in which:

Fig. 1 is a perspective view of a conveyor made up of two sections.

Fig. 2 is a fragmentary sectional view showing the coupling between the sections when the sections are in full extended position.

Fig. 3 is a sectional view taken along the line 3—3.

Fig. 4 is a side view of the sections coupled together.

Fig. 5 shows a plurality of sections coupled together.

Fig. 6 is an end view of the sections telescoped together.

Fig. 7 is a side view of the upper end of the nestled or telescoped sections in partially extended position.

Figure 8:
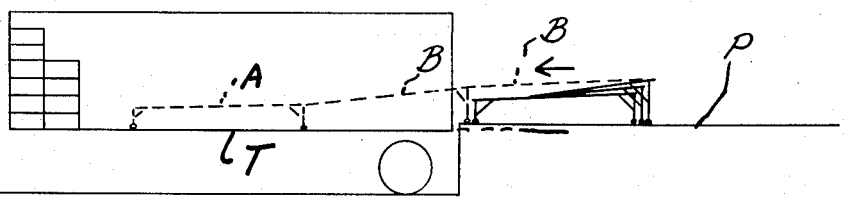
Fig. 8 is a schematic view of the telescoped conveyors loading a vehicle wherein the platform is above the level of the floor of the vehicle.

Referring now in greater detail to the drawings, wherein similar reference characters refer to similar parts, I show a conveyor made up of a plurality of sections, one section being designated as A, and the other sections being designated as B, and wherein the sections will automatically couple themselves together along a continuous and not interrupted plane.

A section A comprises a pair of side rails C, C wherein each rail being of identical construction and is mounted upon four legs. The side rails are rigidly mounted together by virtue of shafts 10 upon which rollers 12 are mounted and upon which rollers articles are conveyed. The side rails C, C on section A comprise S-like or question mark channel irons which run the length of the section and are of rigid metal material. The S-like rail C has two horizontally extending flanges 14, 16 joined by a web 18 at one side, and from the free end of the lower horizontally extending flange is a vertically extending depending flange 20.

The vertically depending flange 20 serves to limit the movement of the rail C by abutting its adjacent rail C, on another section, and flange 20 carries a roller 34 and a stop 36 near its front free end. The web 18 carries the roller supporting shafts 10.

The side rails C carry adjustable legs 22 and the bottom of each leg 22 preferably is mounted upon a roller 24 so that the conveyors may be rolled from one place to another.

The side rails C, C of section A have two adjustable legs at each end so that the height of each end of the rail may be adjusted. The higher end of the rail C has a slightly inclined U-shaped extension, generally designated as D, welded to the end of the flanges 14 and 16 and the web 18. The inclined extension D is U-shaped in cross-section and it has parallel flanges 26 and 28 joined by a web 30. A wall 32 joins the web 30 together with the flanges 26 and 28, and it serves to act as a stop. The flange 26 on the inclined U-shaped extension D forms an angle approximately 30 degrees to that of the plane of the flange 14 so that the wall 32 of the extension D serves as a stop; it is lower than the flange 14 and the wall 32 lies substantially at the lowermost end of the depending flange 20. The forward end of the conveyor section B has a roller 34 rotatably mounted upon shaft 34A and beneath it is a projection or stop 36 which is adapted to abut against the wall stop 32. The roller 34 is adapted to roll upon the inclined flanges 26 of member D, 14 of the side rail C and the projection 36 does not hinder the movement of the roller. Hence, to telescope the sections A and B, the sections A and B are pushed together so that the roller 34 of section B rides upon the flange 14 of side rail C of section A.

In order to better provide for conveying articles upon the telescopic rails it is to be remembered that the rollers on section A and on section B should be in the same inclined plane, and that no hiatus should exist between the rollers of first section A and the second section B. When sections A and B are pulled apart and the stop 36 abuts the stop 32 the flange 14 of each side rail C, C will lie in the same plane automatically without the necessity for the operator to take any additional steps. However, there would be a gap between the top of the flanges 14, 14 of each section A and B which gap would be the length of the extension D. The roller 34 serves as a pivot line whereby the section B pivots up and down on the first section A and whereby a third section B may pivot on the second section B. In order to close this gap between sections so that the articles being conveyed would not suddenly hit a braking obstacle or pit, a pivotally mounted row of rollers, which is generally designated as E is mounted upon one end of the section B and the pivotally mounted row of rollers includes a link 38 pivotally mounted on a side rail C at 39 which is joined by a rod 40 that carries rollers 42 which are identical to the rollers 12. The shaft 40 rests upon the flange 26 so that the rollers 42 lie in the same plane as the rollers 12 on each of the sections A and B.

It is to be noted that the first section A has rollers at the forward end and at the rear end, or at the lower end of the rail and at the upper end of the rail. Whereas, the second section B has rollers only at one end of the rails since the other end of the section B is supported upon the flange 14 or 26 of the adjoining section. When the sections are collapsed, it is easy for the operator to push the sections together and it is just as easy for him to pull the sections apart to have a long conveyor.

Figure 9:
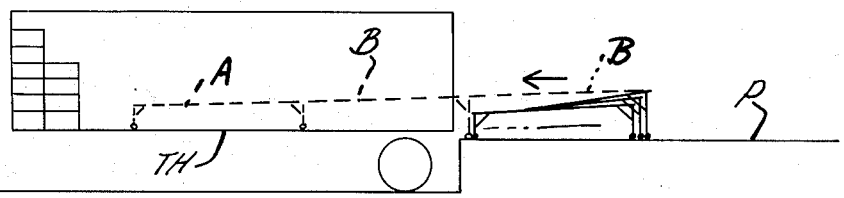
Fig. 9 is the same as Fig. 8 except that the platform is lower than the floor of the vehicle which is being loaded.
Figure 10:
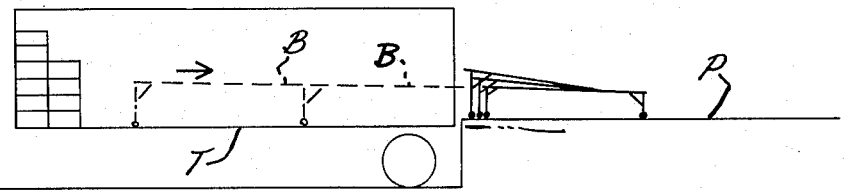
Fig. 10 is a schematic view of the conveyor embodying my invention for unloading the contents of a vehicle wherein the floor of the vehicle is lower than the platform.
Figure 11:
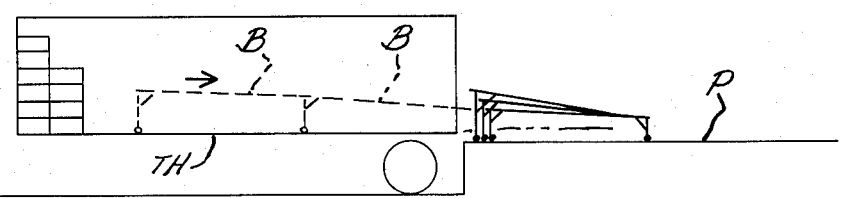
Fig. 11 is a view the same as Fig. 10 except the platform is lower than the floor of the vehicle which is being unloaded.

In order to emphasize the advantage of this invention, in Fig. 8 it is to be noted that the conveyors are to be located on a platform and the vehicle whereby the articles may be carried into the vehicle. The platform is above the level of the floor of the vehicle T and it is to be noted that the sections A, B, B form a continuous plane slightly irregular. In Fig. 9 the level of the vehicle floor TH is above the platform P. In Figs. 8 and 9 the vehicle is to be loaded. In Figs. 10 and 11, the vehicle is to be unloaded. In Fig. 10 the level of the vehicle floor T is below the level of the platform P. In Fig. 11 the height of the platform P is below the floor of the vehicle TH.

Although my invention has been described in considerable detail, such description is intended as being illustrative rather than limiting, since the invention may be variously embodied and the scope of the invention is to be determined as claimed.

I claim as my invention:

1. A gravity conveyor comprising a plurality of sections, one section having ground engaging legs at each end thereof, a second section having a roller at one end wherein said roller is in rolling engagement with said first section and legs at the other end resting upon the ground, the roller of said second section being in rolling engagement with said first section at any point along said first section whereby said second section may move in a vertical plane and in a horizontal plane with respect to said first section.

2. A gravity conveyor comprising a plurality of sections, one section having ground engaging legs at each end thereof, a second section having a movable pivot at its one end in pivotal engagement with said first section and legs at the other end resting upon the ground, the movable pivot of said second section being pivotally engaged with said first section at any point along said first section whereby said second section may move in a vertical plane and in a horizontal plane with respect to said first section.

3. A gravity conveyor comprised of a plurality of sections wherein one section has two parallel S-like side rails connected transversely by a rod on which rollers are mounted, said S-like side rails having two horizontally extending flanges with one of the flanges being uppermost, adjustable ground supporting legs at each end of said first section, one end of each side rail having a U-shaped extension inclined downwardly from the uppermost flange, a wall joining the end of said U-shaped extension, a second conveyor section having legs at one end and a forwardly extending roller riding upon the uppermost flange of said side rails of said first named section whereby said second section will pivot at any point upon said first section, and means on said second section and complementary to said wall to limit the longitudinal extension of said two sections.

4. The invention of claim 3 wherein a pivoted member is attached adjacent one end of said second section, said pivoted member carrying a plurality of rollers which is adapted to form a continuous path at the junction of said two sections when they are in an extended positions.

5. A gravity conveyor comprising a plurality of sections, one section having ground engaging legs at each end thereof, a second section having a movable pivot at its one end in pivotal engagement with said first section and legs at the other end resting upon the ground, the movable pivot of said second section being pivotally engaged with the upper surface of said first section at any point along said first section whereby said second section may move in a vertical plane and in a horizontal plane with respect to said first section.

References Cited in the file of this patent

UNITED STATES PATENTS

| | | |
|---|---|---|
| 2,609,076 | Brent | Sept. 2, 1952 |
| 2,613,788 | McLaughlin | Oct. 14, 1952 |
| 2,627,959 | Seward | Feb. 10, 1953 |
| 2,627,960 | Eberle | Feb. 10, 1953 |